(No Model.)
T. A. PERRY.
TROUGH FOR WATERING STOCK.
No. 396,595. Patented Jan. 22, 1889.
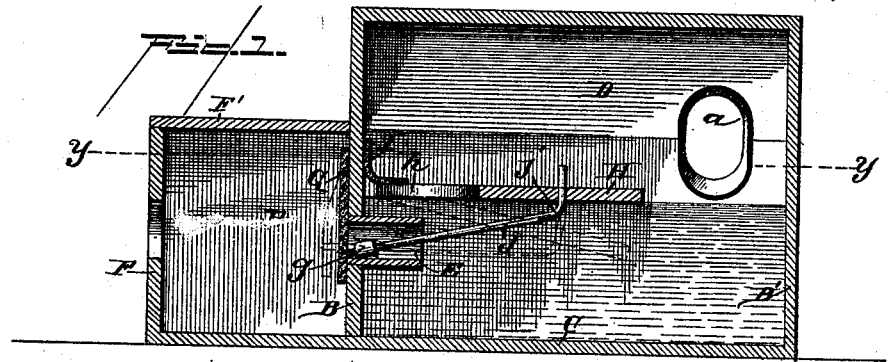
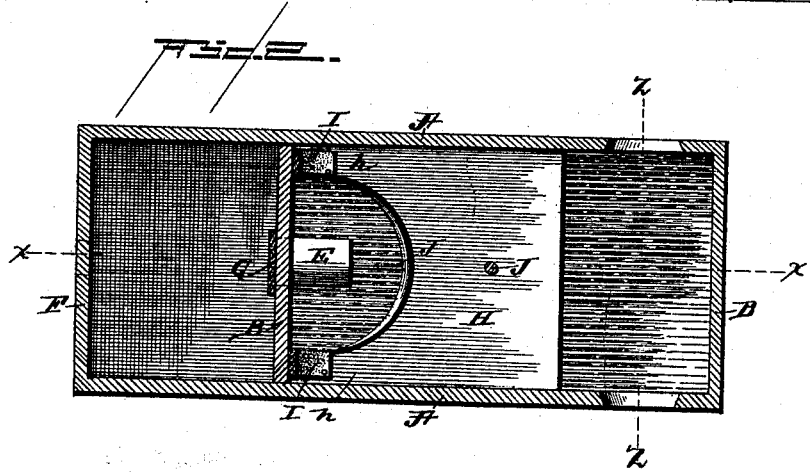
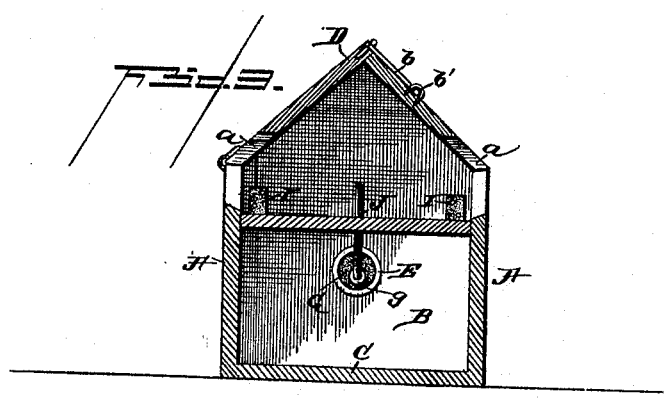
WITNESSES:
INVENTOR.
Thomas A. Perry
By R. S. & A. P. Lacey
Attorneys

UNITED STATES PATENT OFFICE.

THOMAS A. PERRY, OF ABILENE, KANSAS.

TROUGH FOR WATERING STOCK.

SPECIFICATION forming part of Letters Patent No. 396,595, dated January 22, 1889.

Application filed August 15, 1888. Serial No. 282,779. (No model.)

*To all whom it may concern:*

Be it known that I, THOMAS A. PERRY, a citizen of the United States, residing at Abilene, in the county of Dickinson and State of Kansas, have invented certain new and useful Improvements in a Device or Trough for Watering Stock; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to troughs for watering stock, and has for its object to contrive a trough that will permit the stock to obtain ample water, and which at the same time will prevent them getting in the trough and fouling the water.

The improvement consists of the peculiar construction and combination of the parts, which hereinafter will be more fully described and claimed, and shown in the annexed drawings, in which—

Figure 1 is a vertical central longitudinal sectional view of a trough on the line $x\ x$ of Fig. 2, embodying my invention; Fig. 2, a horizontal section on the line $y\ y$ of Fig. 1; Fig. 3, a vertical cross-section on the line $z\ z$ of Fig. 2, looking to the left.

The trough, composed of the side walls, A, the ends B and B', the bottom C, and the double-inclined top D, is provided at its sides with openings $a$, which flare on their inner sides, and are formed part way in the sides A and the top D to permit the animals to have convenient access to the trough. The top may be removable; but for all practical purposes it is sufficient if one side, as $d$, is made movable or hinged at one edge and fastened at its other edge by suitable devices, as the hook $b$ and the staple $b'$. The end B is provided with the tube E, which effects communication between the trough and a suitable tank or other compartment for holding a supply of water. For convenience and economy of construction the tank is part of the trough, and is formed by extending the sides A A and the bottom C beyond the end B, and closing the outer end and top by the wall F and the cover F', respectively. In this event the end wall, B, forms in effect a partition between the trough proper and the water-compartment.

The check-valve G, of yielding material, as rubber or leather, is secured at its upper end to the wall B, and is adapted to have its lower end closing against the outer end of the supply-tube E. The float H, of a width to snugly fit between the sides A A of the trough, has its rear edge cut away to form the arms $h\ h$, and is connected with the wall B by the leather or like straps, I. The rod J, connecting the check-valve with the float, is bent at right angles at $j$, which bent end $j$ extends through the float. The rod passes through the supply-tube, and is enlarged or provided with a guide-sleeve, $g$, near the outer end of the said tube to guide the rod in its movements and prevent it having too much play in the tube. By reason of the flexible or yielding connections I between the float and its support, the said float is free to have a compound movement, the one vertically with the varying level of the water in the trough, the other to and from the supply-tube to adapt it to the movements of the check-valve.

The reservoir or water-compartment is replenished from a suitable fountain-head by the pipe K, which extends through its side.

In practice the trough is filled to a predetermined level, and when the water is at this level the check-valve is held close against the end of the supply-tube by the float and prevents the entrance of more water to the trough. When the water in the trough falls below the given level from evaporation, leakage, consumption, or other causes, the float falls and pushes the check-valve away from the tube, when water from the reservoir will enter the trough until the said level is reached, when a further supply will be checked in the manner above described.

Having thus described my invention, what I claim, and desire to secure by Letters Patent, is—

1. The hereinbefore-described trough for watering stock having a water-compartment at one end formed by the wall B, the short tube E, secured at one end to the wall B, the check-valve G, of yielding or flexible material, the float H, having the arms $h\ h$, which are connected with the wall B by leather, the rod J, having its upper end connected with the said float and having its lower end extended through the tube E and connected with the valve G, substantially as described.

2. The herein-described watering-trough having a water-compartment at one end formed by the wall B, the double-inclined top having openings in its lower edge, which openings extend into the sides of the trough and flare on their inner edges, the short tube E, placed in the wall B, the check-valve G, of flexible material, the float H, having its inner end cut away to form the arms $h\ h$, which are hinged by leather to the wall B, and the rod J, having the guide-sleeve $g$ at its lower end, which end is connected with the check-valve G, and having its upper end bent at right angles and connected with the said float, substantially as set forth.

In testimony whereof I affix my signature in presence of two witnesses.

THOMAS A. PERRY.

Witnesses:
B. A. FLACK,
B. C. CRANSTON.